United States Patent [19]
McGuire

[11] Patent Number: 5,720,350
[45] Date of Patent: Feb. 24, 1998

[54] METHOD FOR RECOVERING OIL FROM A GRAVITY DRAINAGE FORMATION

[75] Inventor: Patrick L. McGuire, Eagle River, Ak.

[73] Assignee: Atlantic Richfield Company, Los Angeles, Calif.

[21] Appl. No.: 642,822

[22] Filed: May 3, 1996

[51] Int. Cl.$^6$ .................................................. E21B 43/25
[52] U.S. Cl. ............................................... 166/305.1
[58] Field of Search ............................... 166/305.1, 306, 166/279, 369

[56] References Cited

U.S. PATENT DOCUMENTS

| | | | |
|---|---|---|---|
| 3,762,474 | 10/1973 | Allen et al. | 166/250.01 |
| 4,022,278 | 5/1977 | Allen | 166/269 |
| 4,205,723 | 6/1980 | Clauset, Jr. | 166/294 |
| 4,560,003 | 12/1985 | McMillen et al. | 166/305.1 |
| 4,834,179 | 5/1989 | Kokolis et al. | 166/268 |
| 5,190,105 | 3/1993 | D'Souza | 166/303 |
| 5,193,617 | 3/1993 | D'Souza | 166/263 |
| 5,246,072 | 9/1993 | Frazier, Jr. et al. | 166/273 |
| 5,339,900 | 8/1994 | Clough | 166/274 |
| 5,339,904 | 8/1994 | Jennings, Jr. et al. | 166/303 |
| 5,363,915 | 11/1994 | Marquis et al. | 166/274 |
| 5,381,863 | 1/1995 | Wehner | 166/263 |
| 5,503,226 | 4/1996 | Wadleigh | 166/252.1 |

*Primary Examiner*—William P. Neuder
*Attorney, Agent, or Firm*—F. Lindsey Scott

[57] ABSTRACT

A method for recovering oil from a gravity drainage oil-bearing formation from which at least a major portion of the oil in place has been recovered through at least one production well penetrating the formation from the surface, the method comprising injecting an oil miscible solvent having a density slightly greater than a gas contained in a gas cap above the oil liquid level in the formation through a production well completed to inject the oil miscible solvent into an upper portion of the formation for a period of time equal to at least one week; recompleting the well for the production of oil from a lower portion of the formation; and producing oil through the well from the lower portion of the formation.

7 Claims, 4 Drawing Sheets

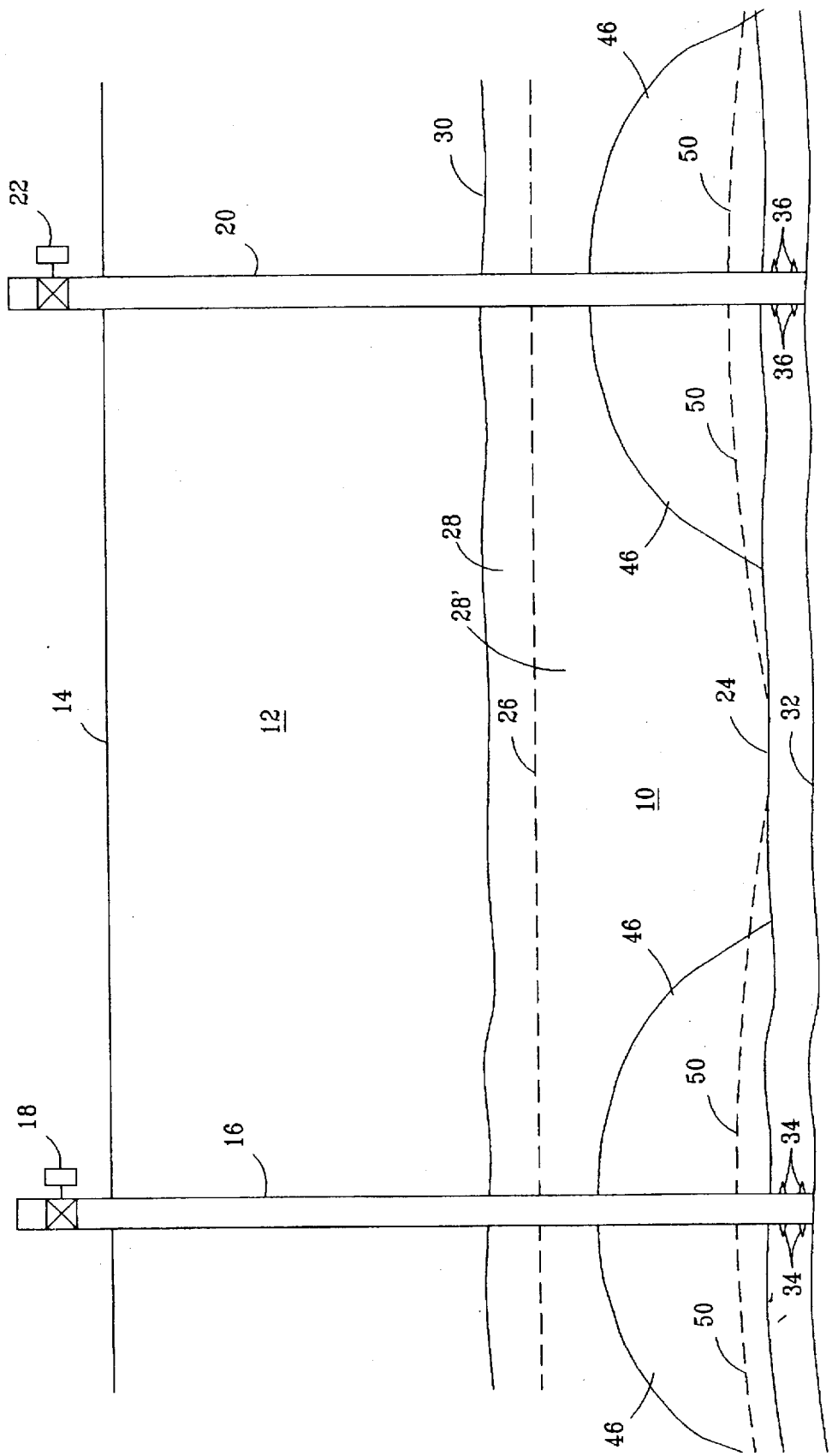

METHOD FOR RECOVERING OIL FROM A GRAVITY DRAINAGE FORMATION

BACKGROUND OF THE INVENTION

1. Field of the Invention

This invention relates to a method for recovering oil from a gravity drainage formation from which at least a majority of the producible oil has been recovered by primary production methods through at least one production well penetrating the formation from the surface.

2. Description of Related Art

Many naturally occurring oil-bearing formations include a gas cap above the oil in the oil-bearing formation. This gas cap is frequently at a pressure sufficient to cause the oil to flow upwardly through wells penetrating the oil-bearing formation under formation pressure. After a portion of the oil has been produced the pressure may have been reduced sufficiently so that oil will not flow to the surface under the formation pressure. At this point, pumps, gas lifts, and the like may be used to produce oil from the formation through the well bores. The pressure is still sufficient, however, to push the oil into the well bore at the lower portion of the formation. As a result, oil drains downwardly through the oil-bearing formation as production is continued. Eventually the level becomes so low that oil can no longer be produced from the formation. Oil production by techniques such as those described above is generally referred to as primary production.

Enhanced oil recovery refers to water flooding, gas flooding, and the like as known to those skilled in the art to recover additional oil.

In gravity drainage formations, the formation below the initial oil level in the formation after primary production is basically saturated with oil with respect to the gas in the gas cap. Substantial oil remains in the formation but cannot be recovered because it is not available in the lower portion of the formation to flow from the formation into a well.

Various methods have been proposed to recover additional oil from such formations. One method is disclosed in U.S. Pat. No. 4,834,179 issued May 30, 1989 to George P. Kokolis and Calvin P. McCoy and assigned to Texaco Inc. and Texaco Canada Resources. This patent discloses a method for recovering additional oil from a previously gas-swept reservoir. The invention discloses that additional oil can be recovered by drilling a horizontal injection well in the upper portion of the formation, injecting a miscible solvent through the horizontal injection well to create a curtain of miscible solvent which falls through the previously gas-swept reservoir and producing hydrocarbons and other fluids that have been banked below the falling miscible solvent through a vertical or horizontal production well. This patent requires the injection of an apparently continuously injected miscible solvent which falls toward the bottom of the formation with continuous production to create a falling curtain of miscible solvent through the formation. The patent requires that horizontal wells be drilled in at least the upper portion of the formation and suggests that injected miscible solvent could not be used around vertical injection wells effectively.

Since the drilling of new horizontal wells is relatively expensive and may economically prohibit the use of a miscible solvent treatment in such gravity drainage formations, a search has been conducted for methods to more effectively and economically treat gravity drainage formations to increase the recovery of oil from such formations.

SUMMARY OF THE INVENTION

According to the present invention additional oil is recovered from a gravity drainage formation without drilling additional wells by a method which comprises injecting an oil miscible solvent having a density slightly greater than a gas contained in a gas cap above the oil liquid level in the formation through a production well completed to inject the oil miscible solvent into an upper portion of the formation for a period of time equal to at least one week; completing the well for the production of oil from a lower portion of the formation; and producing oil through the well from the lower portion of the formation.

BRIEF DESCRIPTION OF THE DRAWINGS

FIG. 4 is a schematic diagram of an embodiment of the method of the present invention after the injection of oil miscible solvent and the resumption of oil production from the formation.

DESCRIPTION OF THE PREFERRED EMBODIMENTS

In the discussion of the Figures the same numbers will be used throughout to refer to the same or similar components. Since pumps, lines, valves and the like necessary to achieve the desired flows are well known to those skilled in the art such equipment has not been shown for the sake of clarity.

Figure 1:
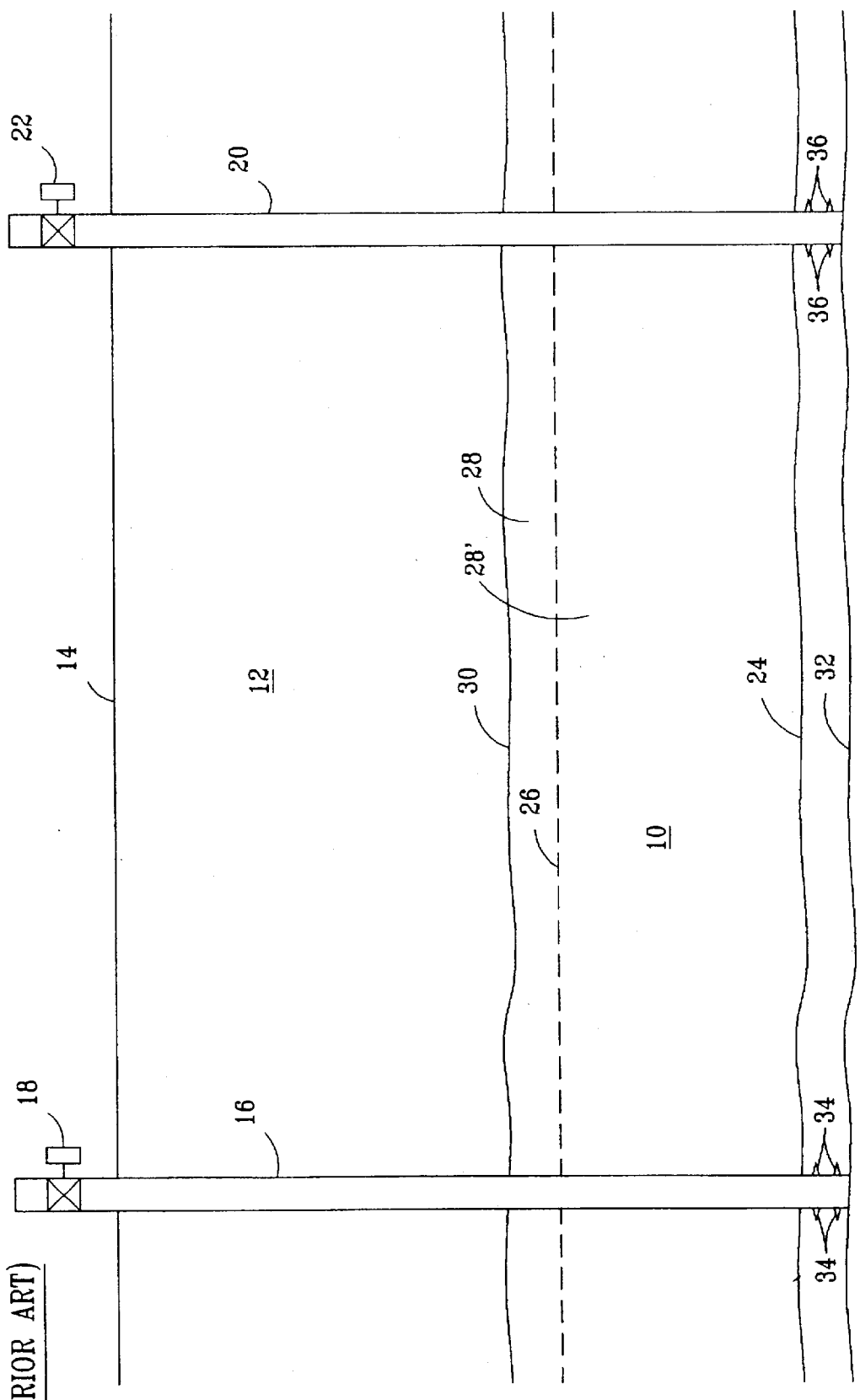
FIG. 1 is a schematic diagram of a gravity drainage formation penetrated by two production wells after primary production from the formation.

In FIG. 1 a gravity drainage formation 10 is shown beneath an overburden 12 and a surface 14. Formation 10 is penetrated by a well 16 including controls shown schematically as a valve 18, at the surface for the control of the injection and production of fluids into and from well 16. A second well 20 also penetrates formation 10 and includes controls shown schematically by a valve 22 for the injection of and production of fluids. In formation 10 the liquid oil level is shown by a line 24. The level is relatively low indicating that the majority of the oil has been pumped from formation 10. A dotted line 26 indicates the initial oil liquid level in formation 10. A gas cap 28 was initially present above dotted line 26. The gas in such formations is typically at an elevated pressure and facilitates the recovery of oil from the formation. As the oil has been produced from formation 10 gas cap 28 has expanded to occupy an additional area shown as 28'. This area is frequently referred to as the secondary gas cap. In this area of the formation the formation contains oil which has not drained from the formation by reason of its viscosity, impermeable areas in the formation, traps in the formation, or the like. The formation in the secondary gas cap area has been gas contacted but retains oil to the residual gas saturation level. Accordingly, substantial quantities of oil remain in the secondary gas cap area. While formation 10 has been shown as a level formation, a bottom 32 of formation 10 may be inclined and oil may drain to lower levels as production is continued and the like. Similarly, a top 30 of the formation may be inclined or domed as known to those skilled in the art. The production of oil either under formation pressure or with pumps and the like from formation 10 is considered to be well known to those skilled in the art. Production by such means is generally referred to as primary production.

Wells 16 and 20 are wells completed as known to those skilled in the art by drilling a well bore into formation 10 followed by casing the well bore with the casing being cemented in place. Production through such well bores is generally accomplished through a production tubing which extends to a desired point in the well with packers and the like being used to control flow of fluids between the production tubing and the annulus. Such variations are well known to those skilled in the art and need not be discussed further. Typically, production or injection through the casing of wells 16 and 20 is achieved by the use of perforations 34 and perforations 36 as shown to provide fluid communication between the well bore and the formation penetrated by the well. Adjustments in the point of fluid injection or production can be achieved by the use of packers, tubing, and the like as also well known to those skilled in the art.

Figure 2:
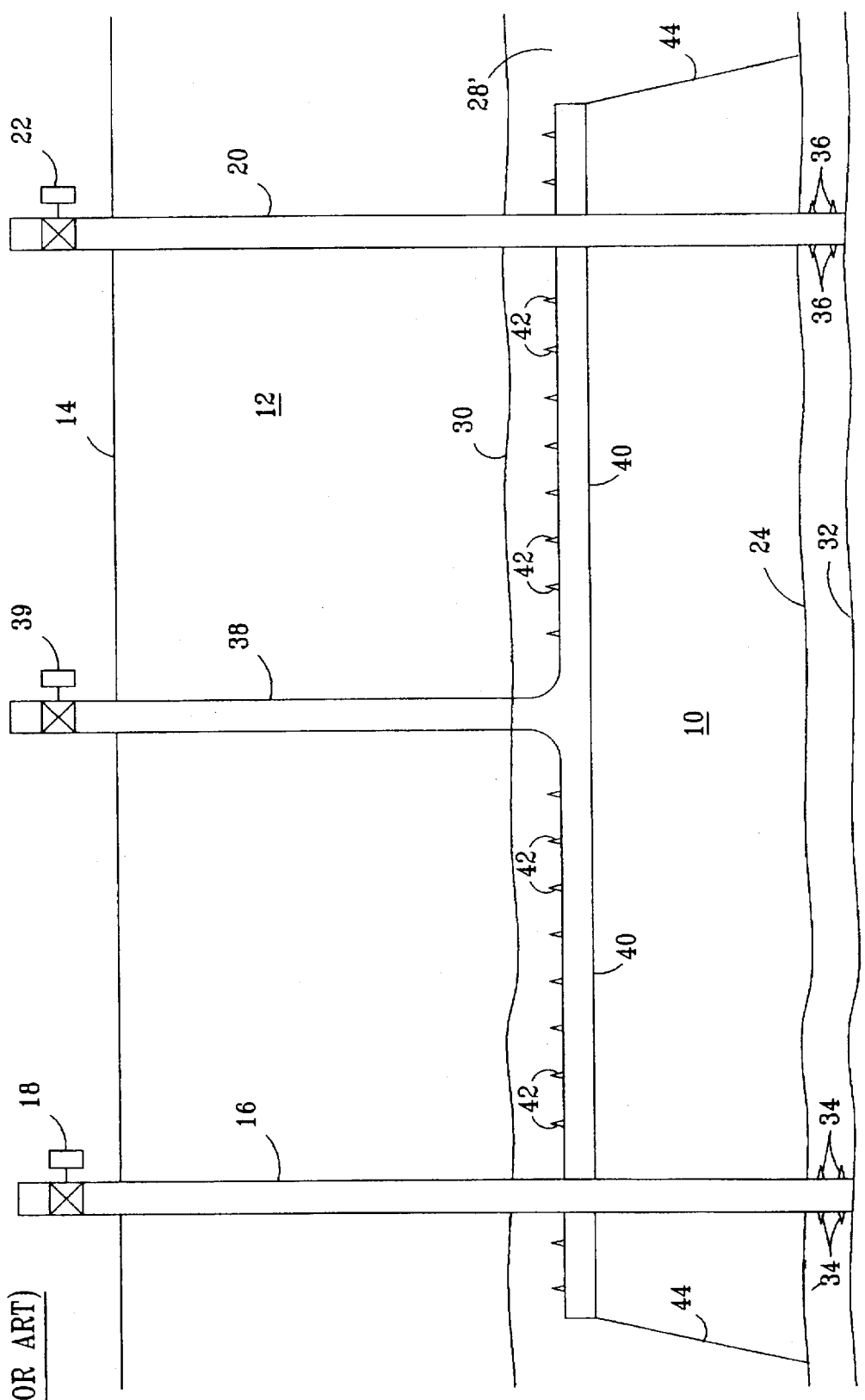
FIG. 2 is a schematic diagram of an embodiment of a process utilizing horizontal injection wells to produce a falling curtain of oil miscible solvent in a gravity drainage formation.

In FIG. 2 a falling curtain oil miscible injection method is shown. This method is similar to that shown in U.S. Pat. No. 4,834,179. As shown, horizontal wells 40 are positioned to extend into an upper portion of formation 10 from a well 38 with solvent injection controls being used to create a falling curtain of solvent 44 beneath the horizontal wells. The controls necessary to achieve the injection of solvent are shown schematically as a valve 39. Oil liquids and miscible solvent may be recovered from formation 10 via wells 16 and 20 as shown. The use of the falling curtain of solvent provides a downwardly flowing stream of solvent which tends to duplicate the sweeping action of the gas in the gas cap as the crude oil is produced from the formation. This method requires the drilling of new injection wells at least a portion of which are horizontal wells. The method also requires the use of separate injection and production wells, thereby necessitating the drilling of additional wells. In the embodiment shown the miscible solvent is injected through horizontal wells 40 and a plurality of perforations 42 in horizontal wells 40. The method requires the use of production wells which are operated to recover solvent which may be used for recycle so that falling curtain of solvent 44 is maintained by the cooperative action of the injection and production wells.

Figure 3:
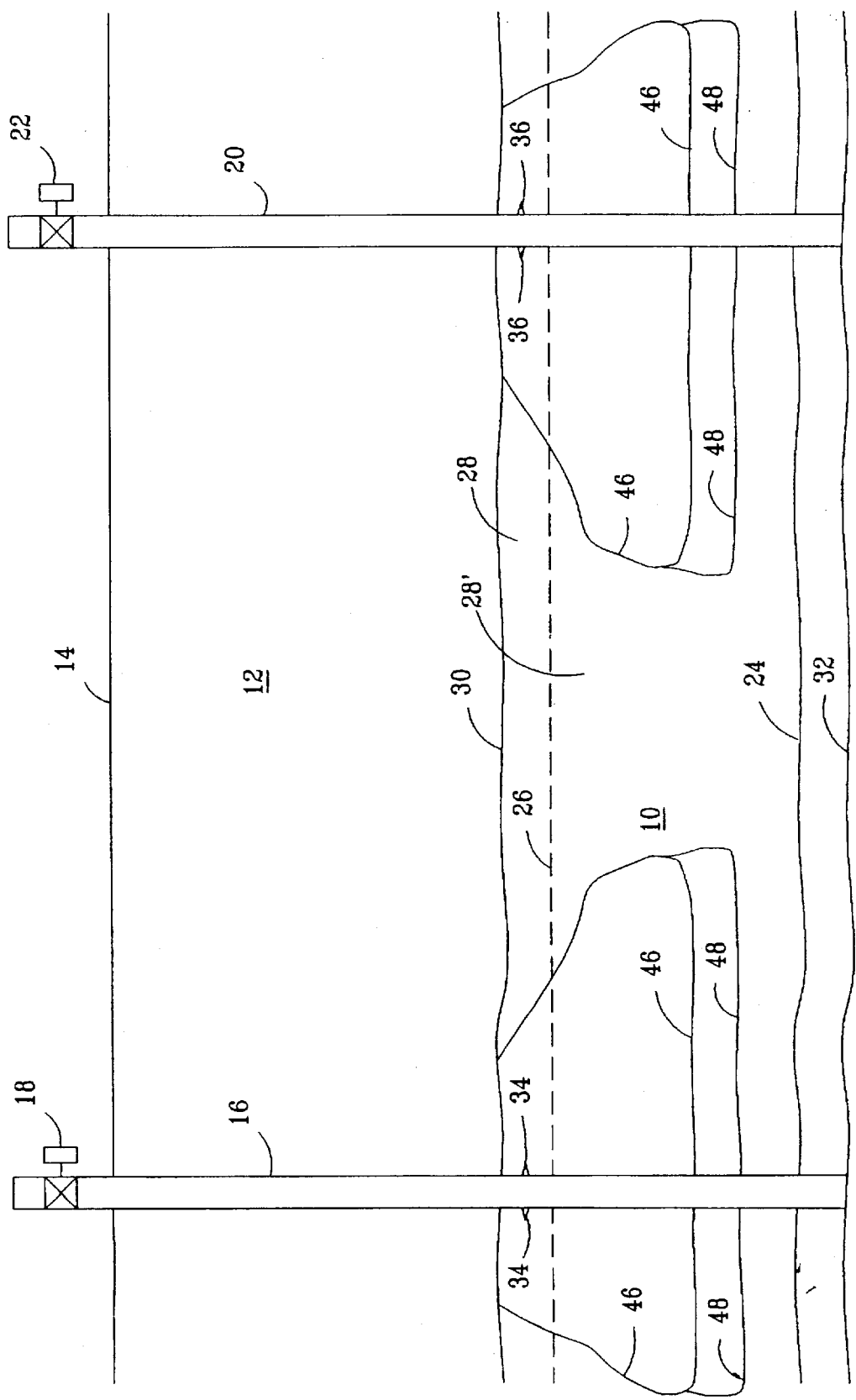
FIG. 3 is a schematic diagram of an embodiment of the method of the present invention for the recovery of additional oil from a gravity drainage formation after primary production.

In FIG. 3 an embodiment of the present invention is shown. In this embodiment the injection wells have been recompleted to inject an oil miscible solvent near or slightly above the top of secondary gas cap 28'. Injection is accomplished through perforations 34 and 36 as shown. It should be appreciated that perforations 34 and 36 are schematic depictions of the injection point rather than an attempt to describe the exact equipment used. Such injection can be achieved by a combination of packers and tubing, by cementing perforations in the lower portion of wells 16 and 20 and reperforating as shown or the like. Such variations are well known to those skilled in the art and need not be discussed in detail. The position of injected miscible solvent after a period of injection from about one week to about one year, and more typically several months, is shown by the line 46. The oil miscible solvent is selected from hydrocarbons containing from 1 to about 6 carbon atoms, carbon dioxide, nitrogen and combinations thereof. The miscible solvent is slightly heavier than the gas in the gas cap. Desirably the miscible solvent is from about 1 to about 20 pounds per cubic foot heavier than the gas in the gas cap. The higher density in the miscible solvent is achieved by enriching the miscible solvent by the addition of quantities of carbon dioxide, hydrocarbons containing from about 2 to about 6 carbon atoms or mixtures thereof. The densities of these component materials are well known and it is well within the skill of those in the art to adjust the density of the miscible solvent to be slightly greater than that of the gas in the gas cap. The oil miscible solvent when injected into formation 10 near the top of the secondary gas cap 28' tends to expand radially from well bores 16 and 20 as shown while sinking slowly toward bottom 32 of formation 10. As the oil miscible solvent moves through the secondary gas cap 28', it removes additional oil from the formation by the extended soaking contact with the miscible solvent and because the enriched solvent removes more oil from formation 10 than the gas in the gas cap. As a result a quantity of oil shown by the line 48 is moved downwardly through the formation by the oil miscible solvent toward the oil level below line 24.

Desirably, the oil miscible solvent is injected at or slightly above the initial oil level 26 in formation 10. Injection of the oil miscible solvent slightly above the initial oil level in formation 10 permits somewhat greater radial expansion of the oil miscible solvent before it settles into the secondary gas cap 28' in formation 10.

When a quantity of solvent which is considered to be sufficient for the recovery of oil in the vicinity of wells 16 and 20 has been injected, the injection is stopped and the oil miscible solvent may be allowed to remain in formation 10 for a period of time. Whether the oil miscible solvent is allowed to remain in formation 10 for a period of time or whether production of oil is resumed immediately the oil production is resumed through perforations in the bottom of wells 16 and 20. Wells 16 and 20 are recompleted to provide for the production of fluids from near the bottom 32 of formation 10.

FIG. 4 is a schematic diagram of the embodiment shown in FIG. 3 after production has been continued for a period of time. The miscible oil solvent has been drawn downwardly through formation 10 with the result that the oil levels around wells 16 and 20 have been increased as shown by dotted lines 50. This increase in oil level in the vicinity of wells 16 and 20 is the result of the removal of oil from the secondary gas cap zone by the miscible solvent treatment in the vicinity of these wells. As the miscible solvent and removed oil is drawn downwardly the levels of oil tend to increase slightly in the area of the wells until production removes the additional oil. The oil level increases in these areas since the movement of the oil away from the wells is restricted by the inward flow of oil and miscible solvent in the vicinity of the wells. In any event, additional oil is recovered from formation 10 and flows to the oil liquid zone shown by the line 24 for production through wells 16 and 20.

The method of the present invention does not require that additional wells be drilled and it provides a method by which additional oil is removed from the secondary gas cap 28' by injection through existing production wells. This provides a much more economical oil recovery method than previously available to the art. The result of the use of the method of the present invention is enhanced oil recovery at a relatively low cost from a formation which has reached the end of its useful life for primary production.

Having discussed the present invention by reference to certain of its preferred embodiments, it is respectfully pointed out that the embodiments disclosed are illustrative rather than limiting in nature and that many variations and modifications are possible within the scope of the present invention. Many such variations and modifications may be considered obvious and desirable by those skilled in the art based upon a review of the foregoing description of preferred embodiments.

Having thus described the invention, I claim:

1. A method for recovering oil from a gravity drainage oil-bearing formation from which at least a major portion of the oil in place has been recovered through at least one production well penetrating the formation from the surface, the method comprising:

a) injecting an oil miscible solvent having a density slightly greater than a gas contained in a gas cap above the oil liquid level in the formation through a production well completed to inject the oil miscible solvent into an upper portion of the formation for a period of time equal to at least one week;

b) recompleting the well for the production of oil from a lower portion of the formation; and, c) producing oil through the well from the lower portion of the formation.

2. The method of claim 1 wherein the oil miscible solvent is selected from hydrocarbons containing from 1 to about 6 carbon atoms, carbon dioxide, nitrogen and mixtures thereof.

3. A method for recovering oil from a gravity drainage oil-bearing formation from which at least a major portion of the oil in place has been recovered through at least one production well penetrating the formation from the surface, the method comprising:

a) injecting an oil miscible solvent selected from hydrocarbons containing from 1 to about 6 carbon atoms carbon dioxide, nitrogen and mixtures thereof, having a density slightly greater than a gas contained in a gas cap above the oil liquid level in the formation and containing a higher percentage of hydrocarbons containing from about 2 to about 6 carbon atoms than the gas contained in the gas cap through a production well completed to inject the oil miscible solvent into an upper portion of the formation for a period of time equal to at least one week;

b) recompleting the well for the production of oil from a lower portion of the formation; and, c) producing oil through the well from the lower portion of the formation.

4. The method of claim 3 wherein the oil miscible solvent has a density equal to at least 1 pound per cubic foot greater than the gas contained in the gas cap.

5. The method of claim 4 wherein the density of the miscible solvent is from about 1 to about 20 pounds per cubic foot greater than the gas contained in the gas cap.

6. The method of claim 1 wherein the period of time is equal to from about 7 week to about 1 year.

7. The method of claim 3 wherein the period of time is equal to from about 1 week to about 1 year.

* * * * *